(12) United States Patent
Connor

(10) Patent No.: US 7,889,425 B1
(45) Date of Patent: Feb. 15, 2011

(54) DEVICE WITH ARRAY OF SPINNING MICROLENSES TO DISPLAY THREE-DIMENSIONAL IMAGES

(75) Inventor: Robert A. Connor, Minneapolis, MN (US)

(73) Assignee: Holovisions LLC, Minneapolis, MN (US)

( * ) Notice: Subject to any disclaimer, the term of this patent is extended or adjusted under 35 U.S.C. 154(b) by 236 days.

(21) Appl. No.: 12/317,857

(22) Filed: Dec. 30, 2008

(51) Int. Cl.
G02B 27/22 (2006.01)

(52) U.S. Cl. .................. 359/463; 359/462; 359/464; 348/59

(58) Field of Classification Search .......... 359/463, 359/464, 462; 348/54, 59
See application file for complete search history.

(56) References Cited

U.S. PATENT DOCUMENTS

| | | | |
|---|---|---|---|
| 3,199,116 A | 8/1965 | Ross | |
| 3,666,465 A * | 5/1972 | Winnek | 355/77 |
| 4,692,878 A | 9/1987 | Ciongoli | |
| 5,300,942 A | 4/1994 | Dolgoff | |
| 5,465,175 A * | 11/1995 | Woodgate et al. | 359/463 |
| 5,602,679 A | 2/1997 | Dolgoff et al. | |
| 5,790,086 A | 8/1998 | Zelitt | |
| 5,900,982 A | 5/1999 | Dolgoff et al. | |
| 5,986,811 A | 11/1999 | Wohlstadter | |
| 6,014,259 A | 1/2000 | Wohlstadter | |
| 6,201,565 B1 | 3/2001 | Balogh | |
| 6,259,450 B1 | 7/2001 | Chiabrera et al. | |
| 6,329,963 B1 | 12/2001 | Chiabrera et al. | |
| 6,344,837 B1 | 2/2002 | Gelsey | |
| 6,437,920 B1 | 8/2002 | Wohlstadter | |
| 6,791,512 B1 | 9/2004 | Shimada | |
| 6,795,241 B1 | 9/2004 | Holzbach | |
| 6,798,390 B1 | 9/2004 | Sudo et al. | |
| 6,929,369 B2 | 8/2005 | Jones | |
| 7,123,287 B2 | 10/2006 | Surman | |
| 7,167,313 B2 | 1/2007 | Wohlstadter | |
| 7,265,902 B2 * | 9/2007 | Lee et al. | 359/463 |
| 7,297,474 B2 | 11/2007 | Aizenberg et al. | |
| 7,508,589 B2 * | 3/2009 | Robinson et al. | 359/619 |
| 7,688,376 B2 * | 3/2010 | Kondo et al. | 348/340 |
| 2005/0111100 A1 | 5/2005 | Mather et al. | |
| 2005/0248972 A1 | 11/2005 | Kondo et al. | |
| 2005/0270645 A1 | 12/2005 | Cossairt et al. | |
| 2005/0285936 A1 | 12/2005 | Redert et al. | |
| 2006/0158729 A1 | 7/2006 | Vissenberg et al. | |
| 2006/0244918 A1 | 11/2006 | Cossairt et al. | |
| 2007/0035829 A1 | 2/2007 | Woodgate et al. | |
| 2007/0058127 A1 | 3/2007 | Mather et al. | |
| 2007/0058258 A1 | 3/2007 | Mather et al. | |
| 2007/0097019 A1 | 5/2007 | Wynne-Powell et al. | |
| 2008/0007511 A1 | 1/2008 | Tsuboi et al. | |
| 2008/0117289 A1 | 5/2008 | Schowengerdt et al. | |
| 2008/0192111 A1 | 8/2008 | Ijzerman | |
| 2008/0204871 A1 | 8/2008 | Mather et al. | |
| 2008/0273242 A1 | 11/2008 | Woodgate et al. | |

* cited by examiner

Primary Examiner—Audrey Y Chang (57) ABSTRACT

This invention is a device for displaying three-dimensional images using an array of spinning microlenses. It can create high-resolution, large-scale, moving, three-dimensional images that can be viewed by people in different locations, with full parallax, without special eyewear. Unlike currently available methods, this invention: does not require special eyewear, works for multiple viewers, provides parallax in all directions, does not have a very restrictive viewing zone, does not produce only transparent images, does not require coherent light, is scalable to large displays, does not require liquid movement to adjust lens shape, and does not require complex systems to individually control large numbers of lenses.

14 Claims, 6 Drawing Sheets

DEVICE WITH ARRAY OF SPINNING MICROLENSES TO DISPLAY THREE-DIMENSIONAL IMAGES

BACKGROUND AND RELATED ART

Currently, there are four general approaches to displaying three-dimensional images: (1) methods requiring special eyewear; (2) methods using three-dimensional display surfaces; (3) methods using holography; and (4) methods using parallax barriers and lenses.

(1) Special Eyewear

Several methods of three-dimensional imaging require special eyewear. The eyewear presents different images to a viewer's right and left eyes. Such methods involving only two different images are generally called "stereoscopic." Many eyewear-based methods have a common source for right and left eye images, but the two different images are differentiated by two different types of lenses on the eyewear. For example, the lenses may differ by color, polarization, or sequential shutters. Other eyewear-based methods involve two different sources for right and left eye images, such as two independent mini-screens close to the eyes.

Disadvantages of special eyewear methods include: the inconvenience of having to wear special eyewear; the lack of multiple perspectives, occlusion, and image shifting in response to viewer movement; and eye strain or damage from conflicting convergence vs. accommodation cues that stress the human visual system. Lack of multiple perspectives, occlusion, and response to image shifting in response to viewer movement can be partially addressed by adding systems that track viewer motion, but these are also inconvenient and are difficult to apply in multi-viewer situations.

(2) Three-Dimensional Display Surfaces

Several methods of three-dimensional imaging use display surfaces that are themselves three-dimensional. Variations in these display surfaces include whether these surfaces are "full-scale" (on the same scale as displayed images) or "micro-scale" (on the same scale as pixels comprising the displayed images), whether these surfaces are stationary or moving, and whether these surfaces emit or reflect light.

Full-scale three-dimensional display surfaces are generally called "volumetric." Stationary volumetric displays often include a series of parallel two-dimensional panels whose transparency can be varied. These panels emit or reflect light to create two-dimensional image slices which, when viewed together, form a three-dimensional image. Less commonly, a translucent gel can be used. Moving volumetric displays often have a spinning (or otherwise cyclically moving) two-dimensional structure that emits or reflects light. The light paths formed as its light emitting or reflecting members sweep through space create a three-dimensional image. Disadvantages of full-scale three-dimensional display surfaces include: they are cumbersome to construct and use for large-scale images with multiple viewers; and displays with transparent or translucent members produce transparent ghost-like images that are not desirable for many purposes.

Micro-scale three-dimensional display surfaces are less well-developed than full-scale surfaces and do not yet have a commonly-used label, but can be thought of as "three-dimensional pixels." In theory, the concept of a three-dimensional pixel is a pixel comprised of an array of sub-pixels, each with image directionality as well as image content. Three-dimensional pixels could be in the form of a cube, sphere, or other shape. The concept of three-dimensional pixels has potential, but entails significant technical and practical challenges that have not yet been resolved. It is very challenging to create an extremely small structure with a sufficient number of fixed radiating "sub-pixels" to produce an image with reasonable resolution from different perspectives. Also, even if such structures of multiple "sub-pixels" can be created, it is very challenging to get them sufficiently close together for image precision without one structure blocking views of an adjacent structure. If the reader will pardon a colorful analogy, it is like trying to design a city block full of several-story apartment buildings wherein people in each apartment all want a view of the river; it is tough to do.

(3) Holographic Animation

Holographic animation has tremendous potential, but is still at an early stage with many technical challenges yet unresolved. Current systems for animated holographic imaging produce relatively small translucent images with limited viewing zones and poor image resolution. They also require coherent light with associated expense and safety concerns. Some day holographic animation may become the method of choice for three-dimensional imaging, but thus far it remains very limited.

(4) Parallax Barriers and Lenses

There are many methods of three-dimensional imaging using parallax barriers, lenticular lenses, fly's eye lenses, variable focal-length lenses, and combinations thereof.

Parallax barriers allow different images to reach a viewer's right and left eyes by selectively blocking portions of images, generally via a layer that is close to the image surface. Light-blocking vertical strips and light-transmitting vertical slits are often used as parallax barriers. Some parallax barriers are stationary. Other parallax barriers move in response to viewer head motion in systems that track this motion. Lenticular lenses are (semi-circular) columnar lenses. They are generally combined in vertical arrays near an image surface. Lenticular lenses direct different views (generally vertical image strips) to a viewer's right and left eyes. Parallax barriers and lenticular lenses can be used together.

Lenticular lenses and parallax slits only provide parallax in one direction. Some parallax in another direction can be achieved by adding a viewer head tracking system and varying image content to reflect viewer head motion, but this is cumbersome for one viewer and problematic for multi-viewer applications. Another disadvantage of parallax barriers and lenticular systems are "pseudoscopic" images outside a severely-restricted viewing zone. "Pseudoscopic" views occur when the images that the eyes see are improperly reversed. "Pseudoscopic" views can cause eye strain, headaches, and other health problems.

A "fly's eye" lens is an array of convex lenses. Three-dimensional imaging using a fly's eye lens is called "integral photography." A fly's eye lens can display a large number of small two-dimensional images from different perspectives. Ideally, as a viewer moves, the viewer sees the same point from different perspectives. Although this concept has considerable potential, it involves significant practical challenges. It is difficult to have a sufficient number of two-dimensional images to achieve high image resolution on a very small scale structure. Viewing zones remain limited. Production of fly's eye screens is also relatively expensive.

New methods have also been proposed for creating three-dimensional images using lenses whose focal lengths can be changed in real time. Such lenses include electro-wetting controlled droplet lenses and liquid-crystal microlenses. Lenses whose focal lengths can be changed are called "dynamic" or "active" lenses. Although application of such lenses to the creation of three-dimensional images has considerable potential, there remain many technical challenges. Systems to independently adjust the focal lengths of a large number of microlenses are complex. Liquids may not move sufficiently rapidly to adjust focal length fast enough for three-dimensional viewing. Viewing zones remain limited.

(5) Summary of Background and Related Art

To summarize the related art, considerable work has been devoted to create ways to display three-dimensional images. However, all of the current methods still have disadvantages. Some methods require inconvenient eyewear and cause eye strain. Some methods require viewer tracking that is inconvenient and does not work well for multiple viewers. Some methods have restrictive viewing zones. Some methods produce transparent, ghost-like images. Some methods produce very small, low-resolution images and require use of coherent light. Some methods have significant unresolved technical challenges concerning the creation of complex microstructures. Some methods do not adjust rapidly enough to display moving three-dimensional images. None of the current methods provide a practical means to create high-resolution, large-scale, moving, three-dimensional images that can be viewed by people in different locations, with full parallax, without special eyewear. The invention disclosed herein addresses these disadvantages.

SUMMARY

This invention is a device for displaying three-dimensional images that comprises an image display surface (wherein this image display surface emits or reflects light to display an image comprised of multiple small image elements such as pixels) and an array of spinning microlenses (wherein the image contents displayed by small image elements are coordinated with the movement of the spinning microlens, through which those image contents are directed, to form a pattern of light rays with the proper content and directionality so as to create perception of three-dimensional images).

This invention provides a novel and practical means to create high-resolution, large-scale, moving, three-dimensional images that can be viewed by people in different locations, with full parallax, without special eyewear. Unlike currently available methods, this invention: does not require special eyewear, works for multiple viewers, provides parallax in all directions, does not have a very restrictive viewing zone, does not produce only transparent images, does not require coherent light, is scalable to large displays, does not require liquid movement to adjust lens shape, and does not require complex systems to individually control large numbers of lenses.

DRAWINGS

Introduction

FIGS. 1 through 10 show some examples of how an array of spinning microlenses can be used to display three-dimensional images. They do not limit the full generalizability of the claims, which can be applied in many other examples.

FIGS. 1 and 2 provide an introductory perspective on what is required to have a two-dimensional image display surface create the perception of three-dimensional images, with full parallax, when viewed by people in different locations.

DETAILED DESCRIPTION

FIGS. 1 through 10 show examples of how three-dimensional imaging may be achieved by using an array of spinning microlenses. However, they do not limit the full generalizability of the claims given later. Many other examples and variations may be created based on the claims.

Figure 1:
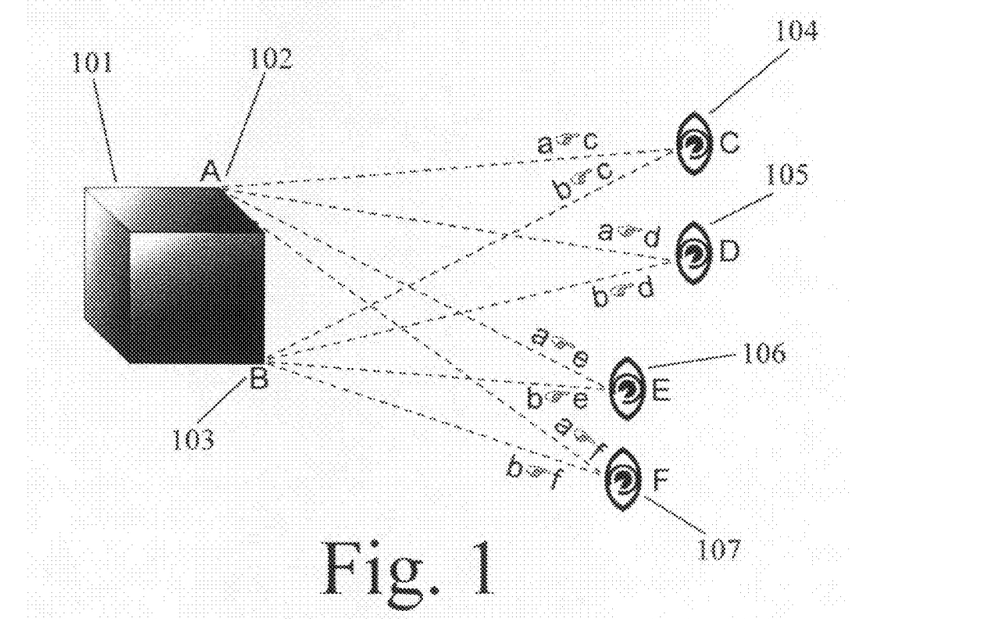
FIG. 1 shows a top-down perspective of an actual cube being seen by two viewers. Specific details are shown for the lines-of-sight from two points on that cube to the eyes of the two viewers.
Figure 2:
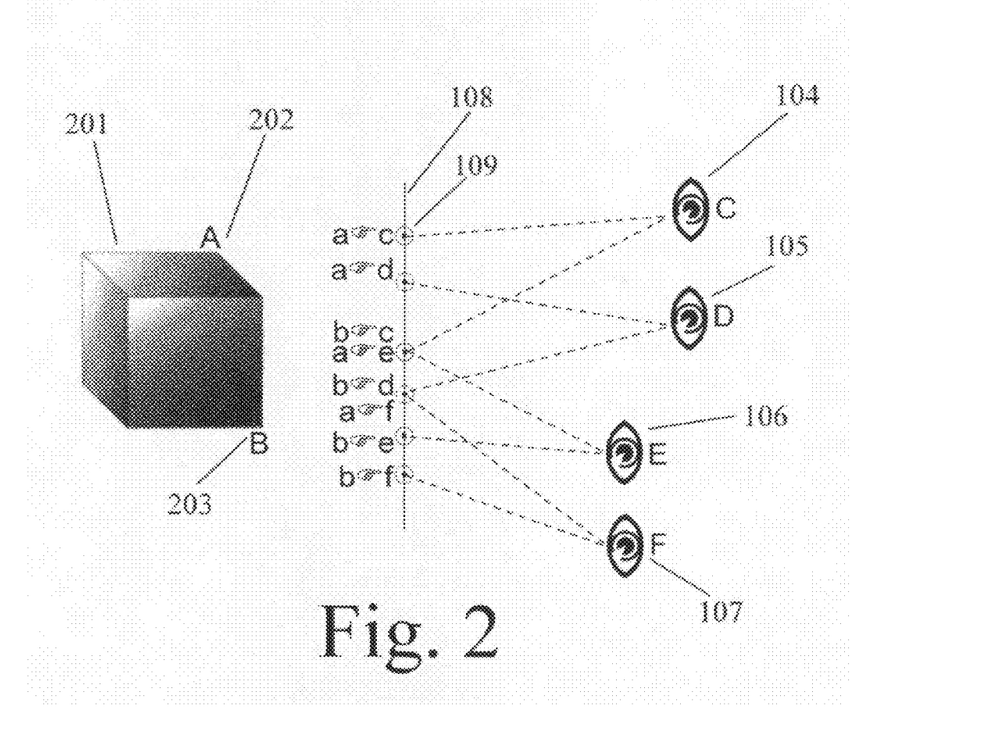
FIG. 2 shows a top-down perspective of a three-dimensional image of a virtual cube based on the actual cube, or at least two points thereof. Perception of those two points on the virtual cube is accomplished by recreating the original image display elements along the original lines-of-sight for the actual points on the actual cube. To reduce clutter in these figures, details are only shown for two points on the cube. However, the concepts apply to other points on the cube. A display system that is able to faithfully display these two points in three-dimensions would be able to display the entire virtual cube in three-dimensions.

FIGS. 1 and 2 provide a conceptual introduction to what types of image elements and light beam directions are required in order to have a two-dimensional surface create the appearance of three-dimensional images, with full parallax, when viewed by people in different locations. In this example, the phrase "small image element" refers to a pixel. In other examples, the term "small image element" could be one of a different type of small image element, wherein these small elements are combined to form an overall image. The creation of two-dimensional images only requires small image elements with image content (such as image color and intensity) and two-dimensional location (such as location in a two-dimensional array). The creation of three-dimensional images from a generally two-dimensional display surface requires small image elements to have appropriate line-of-sight directionality (e.g. display angle) as well as content and two-dimensional location. Creating three-dimensional images from a generally two-dimensional display surface often requires different content to be viewed from the same point from different angles.

FIG. 1 shows a top-down perspective of two sample points, point 102 (also labeled "A") and point 103 (also labeled "B"), on actual cube 101 which is seen by two viewers in different locations. One viewer is represented by the viewer's right eye 104 (also labeled "C") and left eye 105 (also labeled "D"). A second viewer is represented by that viewer's right eye 106 (also labeled "E") and left eye 107 (also labeled "F").

To avoid the clutter of showing lines-of-sight from all of the points on the cube to all four viewer eyes, FIG. 1 shows line-of-sight detail for only the two points, 102 (A) and 103 (B). However the concepts also apply to creating images of a large number of points on the cube. A system that can faithfully recreate eight points of view for two points on the cube can do so for many other points on the entire cube. FIG. 1 shows the eight lines-of-sight, from each of the two points to each of the four eyes. Each line-of-sight is labeled according the directional path of the light ray, starting with the lower-case letter of the originating point (a or b) on the cube and ending with the letter of the receiving eye (c,d,e, or f). For example, the line-of-sight from point "A" to eye "C" is labeled "a→c".

In FIG. 2, there is no longer an actual cube. Instead, there is a three-dimensional image of a virtual cube as perceived by the two viewers. To be precise, to reduce diagram clutter FIG. 2 only shows the lines-of-sight required to create perception of two points, 202 (A) and 203 (B). It does not show all lines-of-sight for the entire virtual cube 201. However, as mentioned earlier, the general concepts could be applied to many points on the cube so as to create a three-dimensional image of the entire virtual cube 201. Accordingly, as a conceptual introduction to the overall imaging process, the entire virtual cube 201 is shown in FIG. 2.

In the example shown in FIG. 2, several image display points, including point 109, are shown along a cross-section of two-dimensional image display surface 108. From these image display points, the eight original lines-of-sight radiate outwards from the two-dimensional surface toward the viewers at the appropriate angles. This creates three-dimensional perception of points 202 (A) and 203 (B) on virtual cube 201. The means by which these image elements are created and these lines-of-sight are directed along different angles is not specified here in FIG. 2, but it is specified in figures that follow. FIG. 2 is intended to provide a conceptual introduction to what is needed, in terms of display content and lines-of-sight, to create three dimensional images. This sets the stage and provides context for the specific examples in the figures that follow.

Figure 3:
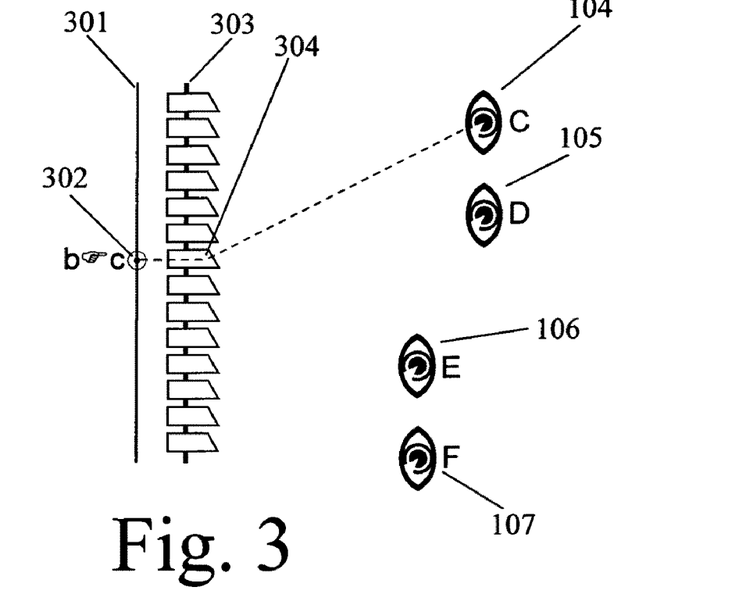
FIGS. 3 and 4 show one example of how a spinning microlens, part of an array of such microlenses, can redirect light rays from one small image element on a display surface along two different lines-of-sight.
Figure 4:
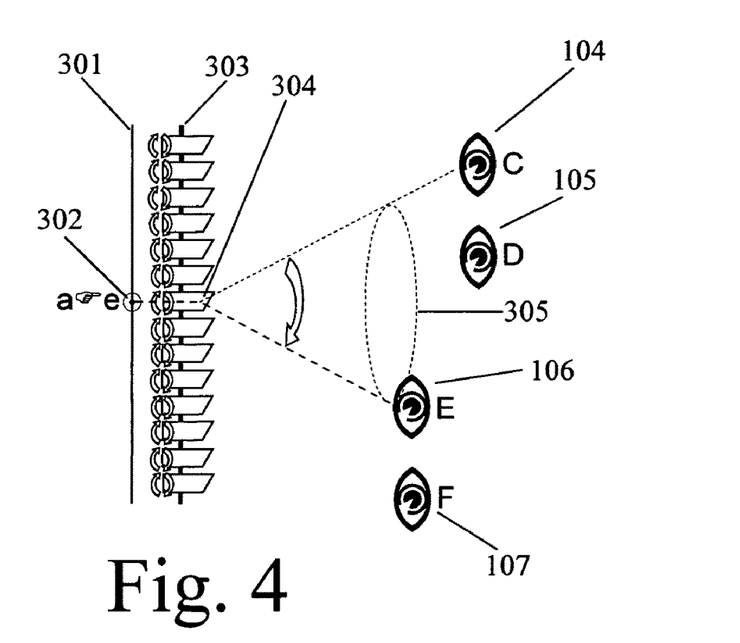

One of the challenges for three-dimensional imaging using a two-dimensional surface is how to create image elements with lines-of-sight (e.g. angular directionality) as well as content. This is especially true when different content must be seen from the same point from different lines-of-sight. This happens on the display surface shown in FIG. 2 at the point from which both line-of-sight image "a→e" and line-of-sight image "b→c" must originate. FIGS. 3 and 4 show how this effect can be achieved using spinning microlenses.

FIGS. 3 and 4 show a top-down cross-sectional perspective of one example of how an array of spinning microlenses can be used to create three-dimensional images. Each spinning microlens redirects light rays along different lines-of-sight from the same small image element on a display surface, allowing the perception of different content when the small image element is viewed from different directions. This allows three-dimensional imaging, with full parallax, from people in different locations.

In FIG. 3, one small image element 302 is shown on top-down cross-sectional slice of display surface 301. In this example, small image element 302 is a Light Emitting Diode (LED). In other examples, a small image element may be a different type of light-emitting element (such as a point on a back-lit screen) or a light-reflecting element (such as a point on a front-lit screen or mirror). There are many methods in the prior art by which images are recorded and reproduced in two-dimensional arrays and these processes are not central to this invention. Thus, they are not specified here.

To reduce diagram clutter, FIG. 3 does not show an entire array of small image elements. An entire array is shown in later figures. A microlens 304 is located in front of small image element 302. In this example, microlens 304 is a columnar lens with: a flat end that is closest to (and parallel to) the display surface into which light from small image element enters without bending; and an acute-angled end that is farthest from the display surface out of which light from the small image element exits with bending. Microlens 304 may be made of glass, crystal, polymer, or some other solid transparent material.

Microlens 304 is part of an array of microlenses held together by lattice structure 303. The lattice structure 303 may be a polymer or metal. In FIG. 3, image content concerning point "B" is displayed when microlens 304 is rotated so that the acute-angled end bends the light beam toward eye 104 (C) along line-of-sight "b→c". Light rays from small image element 302 enter microlens 304 in the flat end that is parallel to the display surface and exit microlens 304 through the acutely-angled surface that bends the light rays along the appropriate point-of-view to eye 104 (C). This recreates the original b→c image along the original line-of-sight.

FIG. 4 shows this example after the array of microlenses, including 304, have spun. They are shown as having spun just a half rotation. In FIG. 4, image content concerning point "A" is displayed when microlens 304 has turned 180 degrees so that it bends the light beam toward eye 106 (E) along line-of-sight "a→e". In FIG. 4, the acute angle of the end of the microlens farthest from the display surface now redirects the light beam from small image element 302 toward eye 106 (E). The image displayed at 302 was timed to display the b→c image in FIG. 3 when the microlens redirected the light beams toward eye 104 (C); it now displays the a→e image in FIG. 4 when the microlens redirects the light beams toward eye 106 (E). With rapid spinning, the light beams exiting microlens 304 defines an expanding cone-shaped space (305) as shown in FIG. 4.

As mentioned previously, a key challenge for three-dimensional imaging from a two-dimensional display surface is how to have different image content viewed from the same point from different viewer angles. In the example shown in FIG. 4, the same point on the image display surface must display content concerning point "B" along line-of-sight "b→c" and must display content concerning point "A" along line-of-sight "a→e". In this example, this is done by displaying the different content in rapid succession, in coordination with the timing of the spinning of microlens 304. When the sequential display of images and the spinning of the microlens is sufficiently rapid, then viewers will see the different images as virtually simultaneous due to persistence of vision in image processing by humans. This is how an array of spinning microlenses is used to create two different three-dimensional images with full parallax, as seen from two different directions, without the need for special glasses or viewer tracking.

In FIG. 4, spinning microlens 304 redirects light beams from small image element 302 in an expanding cone of light that extends outward toward viewers from surface 301. However, when the acute angle of the microlens is fixed and no motion other than spinning is involved, the expanding cone of light will be hollow. In this example, eyes 104 (C) and 106 (E) may be reached by the perimeter of the hollow cone of light, but eyes 105 (D) and 107 (F) are inside or outside the hollow cone of light and thus can not be reached by images from small element 302. One way to address this is to have a second type of array motion in addition to the spinning motion. A second type of motion can help to fill in the hollow cone of light so that virtually all eyes within the cone can be reached. One example of using a second motion is shown in FIGS. 5 and 6.

Figure 5:
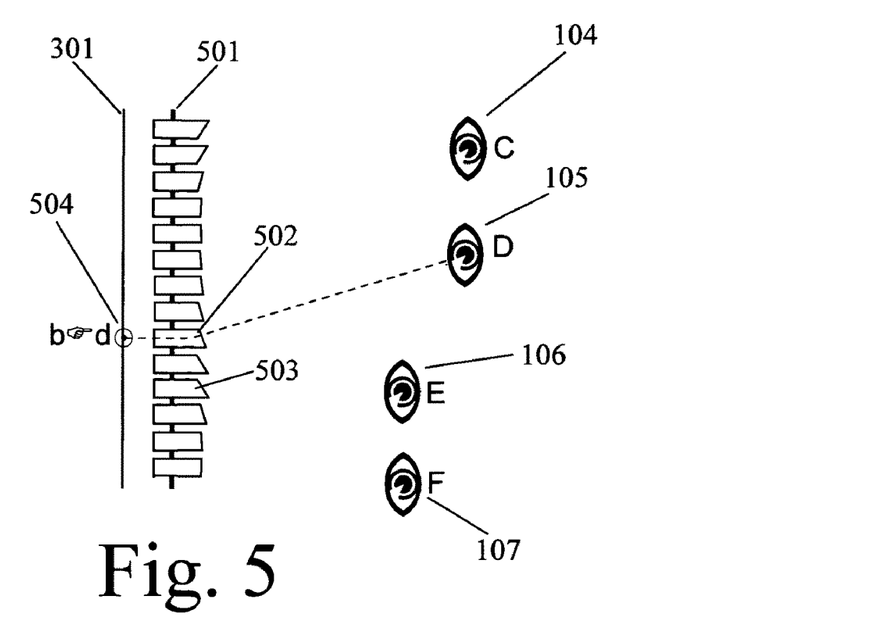
FIGS. 5 and 6 show another example of how three-dimensional display flexibility can be enhanced by moving the entire array of microlenses in addition to the spinning motion of individual microlenses.
Figure 6:
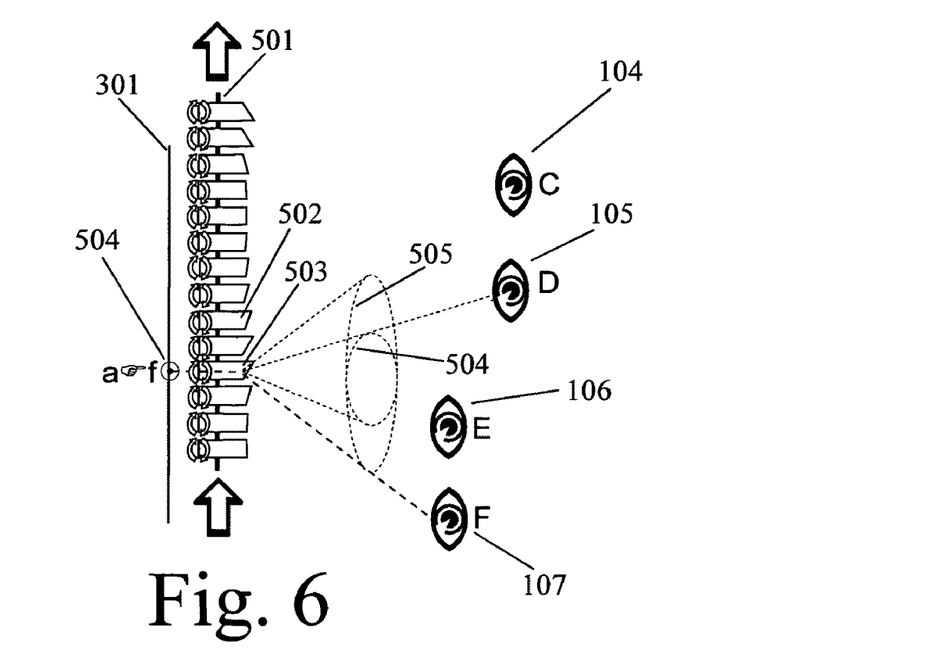

FIGS. 5 and 6 show top-down cross-sectional views of an example wherein: different microlenses in the array have different end angles on the end away from the display surface; and the microlens array is shifted in parallel to the image surface, supplementing the spinning motion of the individual microlenses. In FIG. 5, microlens 502 is one member of the microlens array that is held together by lattice structure 501. Microlens 503 is another member of this microlens array, with an exit angle that is more acute than that of microlens of 502. In FIG. 5, microlens 502 is positioned next to small image element 504 so that microlens 502 redirects light beams (b→d) from small image element 504 along the desired point-of-view path to eye 105 (D).

However, FIG. 6 shows that if one were to simply rotate microlens 502 without any other movement of the array, then one could not redirect light beam (a→f) to eye 107 (F). It is at the wrong angle. The light beam would only move around the cone-shaped space 504. Extension of cone-shaped space 504 might be able to reach eye 106 (E), but can not reach eye 107 (F). To address this, FIG. 6 shows that the lattice structure 501 has been shifted in parallel to the image surface so that microlens 503, instead of microlens 502, is now next to small image element 504. When microlens 503 is rotated, it appropriately redirects light beams (a→f) from small image element 504 to eye 107 (F). The combination of a second motion (such as parallel shifting of the overall array) with the spinning motion of individual microlenses in the array allows greater three-dimensional imaging precision and speed than is possible with either lateral movement or spinning motion alone.

There are different ways to prevent blurring by motion of the overall microlens array. In one example, the motion of the microlens array may be continuous, but the display from the small image elements may flicker at high speed so as to flash an image each time a microlens in the array is perfectly aligned with the small image element. In another example, the display from the small image elements may be continuous, but the motion of the microlens array may be in discrete high-speed jumps from one position of element-lens alignment to another.

Figure 7:
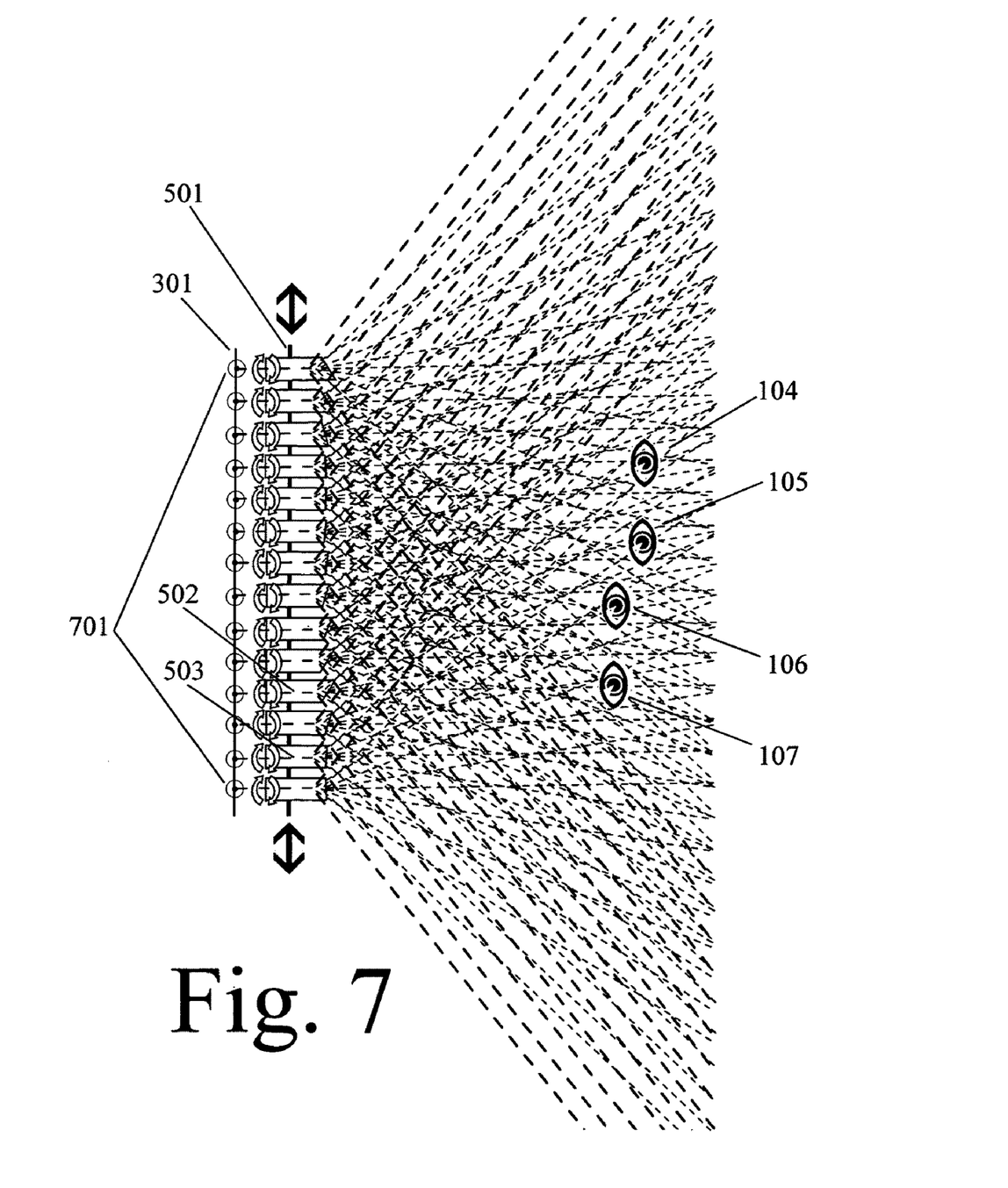
FIG. 7 shows an overall perspective on redirection of light rays from an entire array of small image elements paired with an entire array of microlenses. This creates expanding, overlapping cones of light rays in the view field so that three-dimensional images can be viewed, with full parallax, by people in different locations.

FIG. 7 provides a top-down cross-sectional overall perspective on how redirection of light rays from multiple small image elements by multiple spinning microlenses in a shifting microarray can create multiple overlapping expanding cones of light in the viewing field. This creates three-dimensional images, viewed with full parallax, by people in different locations. Specifically, FIG. 7 shows an array of small imaging elements 701 on imaging surface 301. In this example, there is an array of spinning microlenses, including 502 and 503, that are held together by lattice structure 501, wherein the lattice shifts the microlenses in parallel along the image display surface, in addition to the individual spinning motion of the microlenses. As a result, each of the four eyes (104, 105, 106, and 107) is within a relatively solid light cone of multiple lines-of-sight from each of the small imaging elements.

The display of images and alignment of lines-of-sight from the small image elements are timed with the different lines-of-sight within these cones by microarray movement to create virtual three-dimensional images. These three-dimensional images can be seen by multiple viewers from multiple locations, as long as they are within the overlapping cone-shaped areas. Although FIG. 7 is only a top-down cross-sectional perspective, a similar pattern would appear from a side cross-sectional perspective because the light cones created by spinning microlenses are generally symmetric. Using spinning microlenses allows full parallax vision in any direction within the overlapping cones of light. This is a significant advantage over methods in the prior art that use vertical slits and thus only have horizontal parallax.

Figure 8:
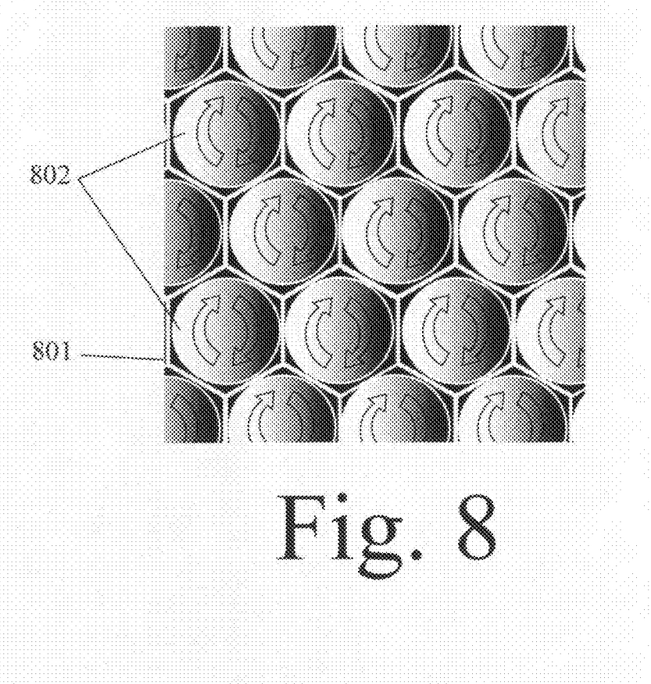
FIGS. 8 and 9 show top and oblique side perspectives, respectively, of an array of spinning microlenses that have flat ends closest to the image display surface and acute-angled ends farthest from the image display surface.
Figure 9:
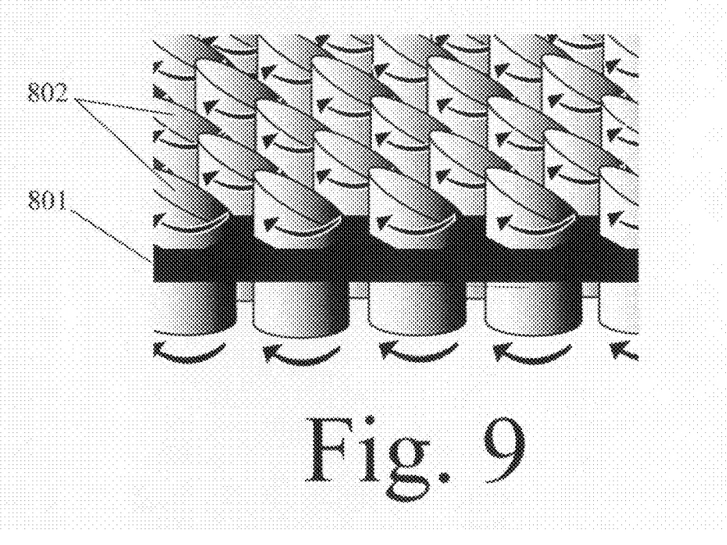

FIGS. 8 and 9 provide additional conceptual perspectives on how one example of an array of spinning microlenses might look. In the example shown in FIG. 8, the spinning microlenses (802) have a circular cross-section and the lattice structure that holds them together is a honey-comb design (801) comprised of hexagons. FIG. 8 shows this example from a perspective looking directly at the angled spinning ends of the microlenses (perpendicular to the plane of the image display surface). FIG. 9 shows this example from an oblique side perspective.

Figure 10:
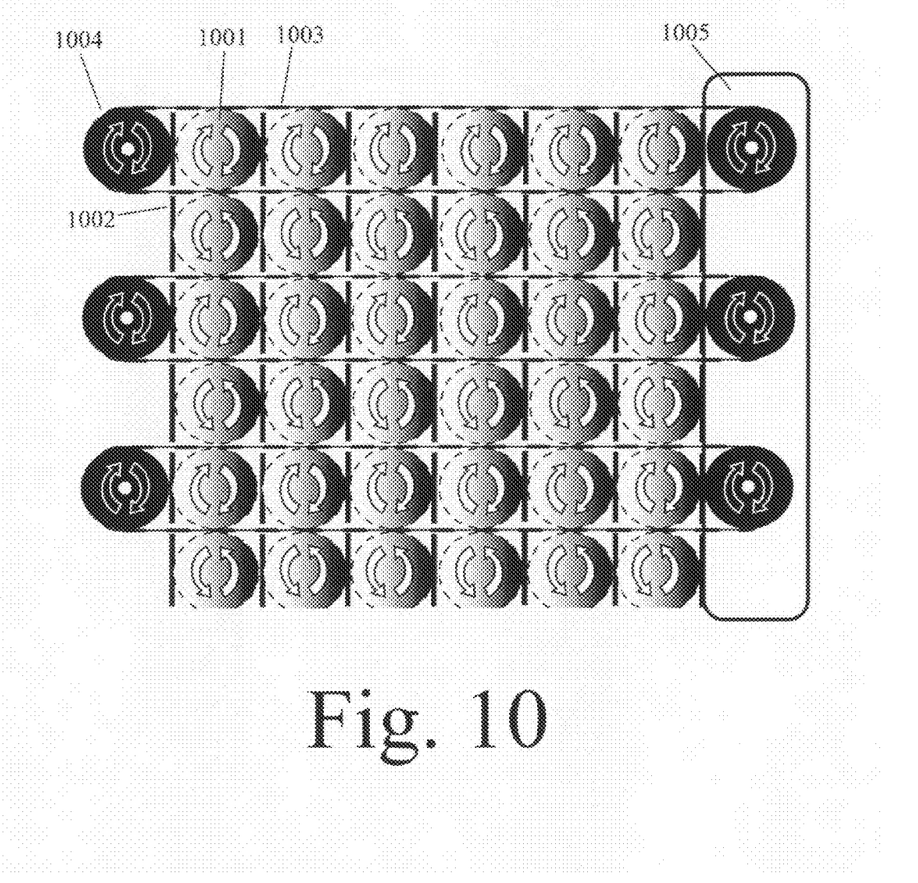
FIG. 10 shows one example of how an array of spinning microlenses may be spun by belts moved by a small electric motor.

Thus far, we have said that the microlenses are spinning, but have not specified what makes them spin. FIG. 10 shows one example of how they may be spun by a series of belts turned by a small electric motor. In FIG. 10, there is an array of spinning microlenses, including microlens 1001. Along one axis, the array of microlenses are held in place by a set of parallel notched partitions, including partition 1002. Along a perpendicular axis, the microlenses are held in place by a set of rotating friction belts, including belt 1003. These belts rotate around wheels, including wheel 1004. These wheels, including 1004, are driven by small electric motor 1005. Many types of friction belts and small electric motors are known and are not central to this invention. In a variation on this example, instead of friction belts, the belts may be chain belts that intermesh with cogs attached to the circumferences of the spinning microlenses. In another variation on this example, the microlenses may be spun by MEMS (Micro Electrical Mechanical Systems).

In another example of how to spin the microlenses, each microlenses may be given a magnetic charge and the array may be surrounded by a structure that creates an electromagnetic field that causes the microlenses to spin. In a variation on this latter example, variation in the electromagnetic field may cause the microlenses to tilt as well as spin. This tilting motion may serve as a second form of motion as alternative to shifting of the microarray as discussed earlier. A combination of mechanical and electromagnetically-induced spinning and tilting is also possible.

I claim:

1. A device for displaying three-dimensional images comprising:
    an image display surface, wherein this image display surface emits or reflects light to display an image comprised of multiple small image elements, and
    an array of spinning microlenses, wherein each spinning microlens redirects light rays from one or more small image elements, wherein light rays exiting a spinning microlens define a conic or conic-section space over time, and wherein the image contents displayed by small image elements are coordinated with the movement of the spinning microlenses, through which those image contents are directed, to form a pattern of light rays with the proper content and directionality so as to create perception of three-dimensional images.

2. The device for displaying three-dimensional images in claim 1 wherein the image display surface has light emitting elements.

3. The device for displaying three-dimensional images in claim 1 wherein the image display surface has light reflecting elements.

4. The device for displaying three-dimensional images in claim 1 wherein each spinning microlens redirects light from one small image element.

5. The device for displaying three-dimensional images in claim 1 wherein each spinning microlens redirects light from multiple small image elements.

6. The device for displaying three-dimensional images in claim 1 wherein each spinning microlens spins around an axis that is generally perpendicular to the image display surface.

7. The device for displaying three-dimensional images in claim 1 wherein each spinning microlens is a column (with a circular or polygonal cross section) with an axis that is generally perpendicular to the image display surface, with a flat end closest to the image display surface and an acute-angled end farthest from the image display surface.

8. The device for displaying three-dimensional images in claim 1 wherein each spinning microlens redirects light rays so as to define an expanding conic or conic-section shape in space over time.

9. The device for displaying three-dimensional images in claim 1 wherein each spinning microlens is spun by mechanical means, via interaction between the microlens and a friction belt.

10. The device for displaying three-dimensional images in claim 1 wherein each spinning microlens is spun by electromagnetic means, via interaction between the microlens and an electromagnetic field.

11. The device for displaying three-dimensional images in claim 1 wherein the directions of the light rays exiting the spinning microlenses are also changed by a second type of microlens motion in addition to the spinning motion of the microlenses, that the cone-shaped space formed by the moving rays over time is more-densely filled with a greater number of light rays along different lines-of-sight, providing more precise and rapid display of three-dimensional images.

12. The second form of microlens motion in claim 11, wherein this second form of motion is motion of the array of spinning microlenses across the image display surface in a plane that is generally parallel to the plane of the image display surface, wherein different microlenses in the array have different end angles, creating cone-shaped space patterns with different radii over time.

13. The second form of microlens motion in claim 11, wherein this second form of motion is mechanically or electromagnetically induced tilting of the axes of the spinning microlenses, creating cone-shaped patterns with different radii over time.

14. A method for displaying three-dimensional images comprising:
   emitting light from, or projecting light onto, a display surface so as to create an image, and
   redirecting light from points on this surface using an array of spinning microlenses, wherein the angular directions of the light rays exiting these microlenses form a light pattern that creates perception of three-dimensional images.

* * * * *